United States Patent [19]

Valeur et al.

[11] 3,982,027
[45] Sept. 21, 1976

[54] METHOD FOR PRODUCING A FEEDING STUFF SUITABLE FOR RUMINANTS

[75] Inventors: Claus Michael Valeur, Olstykke; Peter Bisgaard-Jespersen, Birkerod; Henning Bernstorff Schrøder, Stenlose, all of Denmark

[73] Assignee: Dansk Landbrugs Grovvareselskab A.m.b.A., Copenhagen, Denmark

[22] Filed: Sept. 18, 1974

[21] Appl. No.: 507,023

[30] Foreign Application Priority Data

Sept. 21, 1973 Denmark .............................. 5174/73

[52] U.S. Cl. .................................. 426/69; 426/623; 426/635; 426/637; 426/453; 426/807
[51] Int. Cl.² .......................................... A23K 1/22
[58] Field of Search .............. 426/69, 149, 210, 215, 426/374, 213, 807, 2, 69, 635, 661, 807, 623, 637, 453; 71/26, 28

[56] References Cited
UNITED STATES PATENTS 2,748,001  5/1956  Anderson et al. ..................... 426/69
3,873,728  3/1975  Moore .................................. 426/69 X

FOREIGN PATENTS OR APPLICATIONS 1,201,934  8/1970  United Kingdom ................... 426/69

*Primary Examiner*—Raymond N. Jones
*Assistant Examiner*—R. A. Yoncoskie
*Attorney, Agent, or Firm*—Ladas, Parry, Von Gehr, Goldsmith & Deschamps

[57] ABSTRACT

A feedstuff and method for making such in which a liquid mixture, containing one part by weight of urea, 0.2 to 1.5 parts by weight of acetic acid, 3 to 0.25 parts by weight of molasses and water in an amount of from 0 to 50 percent by weight of the total liquid mixture, is intimately mixed with a finely divided or ground starchy material in such proportions that the liquid mixture will amount to 15–30 percent by weight of the total mix.

8 Claims, No Drawings

METHOD FOR PRODUCING A FEEDING STUFF SUITABLE FOR RUMINANTS

The present invention relates to a method for producing a feeding stuff suitable for ruminants by mixing urea, an acid, and molasses with a starchy material.

Ruminants, contrary to single stomach animals, utilize lower nitrogen compounds such as urea and ammonia. This utilization is conditioned on an existing symbiosis between the host animal (the ruminant) and the microflora in the proventriculi of the animal, particularly in the rumen.

The urea is cleaved by the microorganisms in the animal's rumen to form ammonia, which is assimilated and participates in the protein synthesis of the microflora. In the continuous reproduction and disintegration of the microflora the microbially formed protein will be carried from the proventriculi to the following gastro and intestinal sections and will participate equally with other protein sources in the protein metabolism of the host animal.

For reasons of economy it is important to cover the ruminants' protein requirements predominantly by means of urea. But urea cannot just be introduced into the fodder, because the specific taste thereof would make the fodder unacceptable to the ruminants. Besides, the rumen of cattle has a relatively high ureasis capacity and if substantial amounts of urea are introduced with the fodder the result will be a very rapid cleavage of the urea and high increase of the ammonia concentration, because the consumption of ammonia in the microbial assimilation and protein synthesis would not keep pace.

To enable utilization of substantial amounts of urea as component in feeding stuffs for ruminants it is therefore necessary first to remove or cover up the specific taste of the urea and secondly to reduce the rate of ammonia formation.

Attempts have previously been made to solve these problems by mixing urea with various other nutrients or fillers. The specification of U.S. Pat. No. 2,748,001, for instance, teaches the production of a fodder additive consisting of a solution of phosphoric acid, urea, molasses and water. A further development of that method is the subject of Danish patent No. 114,244, which relates to a specific method in which a diffusion of sugar beet chips is sprayed with an urea-phosphoric acid-molasses solution at increased temperature, on which the mixture is dried. These fodder additives are then admixed in traditional fodder such as maize or barley.

These known methods suffer from the drawback that the mixture comprises substantial amounts of superfluous phosphoric acid and an amount of water that has to be removed by drying.

It is also known to produce fodder based on starchy materials and urea or other simple nitrogen compounds. Danish Patent No. 123,333, for instance, relates to the treatment of a mixture of grain or other starchy materials and urea in the presence of water with heat, pressure and shearing forces, which results in a partial gelatinization of the starch. But that method is rather inconvenient in that it requires treatment at relatively high temperatures in expensive specially designed apparatus or machinery such as mills or extruders. The high temperatures necessary for causing gelatinization may also cause undesirable secondary reactions such as thermal disintegration of the starch.

U.S. Pat. No. 3,677,767 suggests the production of a fodder supplement by reaction of urea and molasses in the presence of a strong acid such as phosphoric acid or sulphuric acid. This process too is carried out during heating, preferably to temperatures above 65°C, for instance 75°C, and the employed acid, which has a catalytic effect during the reaction, then has to be neutralized. The product will thus contain large amounts of undesirable salts, and the heat treatment in the presence of acid may also lead to caramellization of the molasses.

It is the object of the present invention to provide a method for the production of a feeding stuff that is well suited for ruminants on account of a particularly attractive taste and because it enables optimum utilization of the nitrogen content of the urea. It is a further object of the invention to produce the said feeding stuff by a simplified process without the use of expensive and untraditional apparatus and machinery.

These objects have been accomplished by the method according to the invention which is characterized in that the urea is dissolved or suspended in a mixture of from 5 to 90 per cent by weight of concentrated acetic acid, from 95 to 10 per cent by weight of molasses and from 0 to 50 per cent by weight of water, whereupon the derived low viscosity solution is mixed intimately with a finely divided or ground starchy material in such proportions that the liquid mixture will amount to at most 50 per cent by weight of the total mix.

This method produces a mixed fodder that can be used in the form in which it is obtained. But according to the invention it has been found particularly expedient for the mixture to be rolled, tabletted or pelleted under pressure and possibly under the application of heat. The result is a product that is easy to transport but, moreover, the heat and pressure applied during rolling or pelleting will cause chemical conversions in the fodder which improve the utilization thereof by the cattle.

The liquid mixture with which the starchy material is admixed may expediently be a mixture of one part by weight of urea, 0.2 – 1.5 parts by weight of acetic acid and 3 – 0.25 parts by weight of molasses. The optimum ratio is 1 part by weight of urea to about 1 part by weight of acetic acid of a concentration of about 80% and about 1 part by weight of molasses.

It will be expedient according to the invention to mix the liquid mixture and the starchy material in a ratio in which the liquid amounts to 15–30 per cent by weight and the starchy material 85–70 per cent by weight of the mixture. Within this range the result will be a dry product that is suitable for transport and contains nitrogen compounds and starch in a suitable proportion for the nourishment of cattle. The acetic acid is accepted by the cattle on account of its attractive taste. It gives the mixture a pH at which the urease activity will be reduced to the desired value. Besides, acetic acid is an excellent source of energy to cattle. As examples of other applicable organic acids may be mentioned formic acid and lactic acid.

As starchy material may be used any of the customary starchy feeding stuffs used for cattle and as examples may be mentioned barley, oats, maize, potatoes, tapioca, rye, wheat, milo and rice. Good results have been obtained with barley as starchy material and this cereal is readily available in many countries.

In the method according to the invention the first step is the preparation of a liquid mixture which in spite of its relatively low content of water and high content of urea has a surprising low viscosity and by means of which it is possible to obtain a homogeneous mixture with the starchy component without heating the liquid mixture, and the dried end product can be obtained without a subsequent drying. The liquid mixture should preferably have a composition so that the urea is present in completely dissolved state, which enables the formation of a homogeneous end product.

The acetic acid contained in the liquid mixture will react with the starch in the mixed fodder and probably also with the protein component contained in most starchy feeding stuffs. In this reaction, which is promoted by the pelleting of the product under the application of heat, a partial hydrolysis of the starch occurs and a partial coagulation of the protein in the starchy component. Thus the homogeneous mixing alone will produce an increased gelatinization of the starch which results in an increase of the rate at which the microorganisms convert and utilize the starch. At the same time the saccharose contained in the molasses will be substantially hydrolysed to form the monosaccharides glucose and fructose which will participate directly in the carbon conversion of the microorganisms. The starch of the starchy material will be subject to a partial hydrolysis to form maltose and dextrins of varying chain lengths, and such cleavage products will be converted more rapidly than the original starch, though at varying rates. Finally there will be left a certain amount of non-hydrolyzed starch in the mixture. On account of the content of carbohydrates of various kinds and molecular weights the prepared feeding stuff will supply a continuous and adequate amount of energy to the microbial growth and thus to the protein synthesis. The coagulated protein pellicles will impede the release of ammonia for the growth in the rumen. The content of acetic acid will result in a mixture of a pH at which the urease activity is somewhat reduced, preferably between 4 and 5. Thereby the cleavage of the urea will proceed at approximately the same rate as the carbohydrate conversion.

The content of acetic acid, moreover, has a favourable effect on the taste of the fodder. Thus the disagreeable taste of the urea component has practically disappeared in the finished mixture, and the animals will get accustomed to and like the acetic acid containing fodder.

Urease reaches its optimum activity at a pH of 7 and by adjusting the pH of the end product to 4–5 a satisfactory reduction of the urease activity and a consequent reduction of the ammonia concentration in the feed in the rumen of the animal will be obtained.

The content of urea in the liquid mixture may vary within wide limits. Even a minor amount of urea will be valuable and in the above specified combination the cattle will be able to utilize relatively large amounts of urea. The urea should preferably be used in an amount which is soluble in the mixture of molasses and acetic acid, but if desired a smaller amount may be used, or the amount may exceed the maximum soluble quantity, in which case the excess of urea will be present in the mixture.

Investigations were made of the solubility of urea in molasses containing varying amounts of acetic acid. A variation of the concentration of acetic acid, calculated as an 80% solution, in a molasses mixture from 20 to 80% of acetic acid resulted in an increase of the solubility of urea from about 25% to about 45%. The viscosity of acetic acid-molasses mixtures will decrease heavily with the content of acetic acid and already a content of 5% of acetic acid causes a considerable reduction of the viscosity. The pH of the mixtures will vary between about 5 and about 3.5 dependent on the acid content.

The employed liquid mixture may, as mentioned above, contain varying amounts of urea dissolved or suspended in a mixture of 5 – 90 per cent by weight of acetic acid and 95 - 10% of molasses. Such a mixture will have a suitable viscosity, but if desired the viscosity may be further reduced by the admixture of water to facilitate the homogenization with the starchy material, especially where the content of acetic acid is low. The preferred ratio, as already stated, is equal parts by weight of urea, acetic acid and molasses. This composition will result in an effective and homogeneous mixture with the starchy material when this amounts to 85–70 per cent by weight of the total mix. The feeding stuff moreover contains nitrogen compounds and carbohydrates in the proportion that is optimum for cattle.

The method according to the invention will be illustrated below by way of examples:

EXAMPLE 1

In a mixture of 1 part by weight of molasses and 1 part by weight of 80% acetic acid was dissolved one part by weight of technical urea having a low content of magnesium compounds. To 15 parts of the obtained solution was added 85 parts of barley ground in an impact mill. This mixture was introduced into a charge mixer of the Nauta Mixer type. This mixer comprises a conical container with a rotating worm. After thorough mixing the material was pelleted by means of a ring matrix press to form solid 3 mm pellets. The compression develops heat so that the pellets had a temperature of from 30° to 40°C. The pellets were then cooled in a shaft cooler in a blast of atmospheric air. The obtained product was dry, solid and cohesive and of a consistency suitable for cattle fodder.

This method was used for producing 500 kg of finished product, which was distributed in bags of 50 kg, and from each of 3 arbitrary bags was drawn a random sample of 0.5 kg for testing. Moreover an average sample was drawn from the batch during production and prior to compression. This average sample was ground into meal.

EXAMPLE 2

The method of Example 1 was applied with the modification that instead of 15 parts by weight of the said urea-molasses-acetic acid solution was used 30% of the solution and 70% of ground barley. The product was treated in the same manner, except that it was compressed into 8 mm pellets. This product was softer than that of Example 1 and the pellets were tough.

An average sample was drawn from 500 kg. of product in the same way as in Example 1.

Control pellets were made with a content of urea and ground barley but without molasses and organic acid. An average sample of that product and the random samples mentioned in Examples 1 and 2 were analysed, the random samples being analysed separately for content of nitrogen. Moreover the degree of gelatinization and the pH of the control sample and the two products of the examples were determined, a joint sample being drawn from the random samples. The obtained results are set out in the following two tables, Table 1 showing the nitrogen content of the individual random samples and Table 2 the gelatinization and pH of the said average samples. From Table 1 it will be seen that the variation of the nitrogen content is very slight, which indicates a high degree of homogeneity. Table 2 shows that the acetic acid causes reduction of the pH from 7.0 to respectively 5.2 or 5.1 and 4.5. It will also be seen that the degree of gelatinization is substantially higher in the products containing acetic acid than in the control product. The degree of gelatinization was particularly high in the pelleted material, which shows that, as mentioned above, chemical reactions occur also in the pelleting process.

TABLE 1

|  | Sample No. | Nitrogen content in % of dry matter |
|---|---|---|
| Product of Example 1 | 1 | 4.81 |
|  | 2 | 4.79 |
|  | 3 | 4.72 |
| Product of Example 2 | 1 | 7.95 |
|  | 2 | 8.02 |
|  | 3 | 7.99 |

TABLE 2

|  | Gelatinization of starch % | pH value |
|---|---|---|
| Control (ground and pelleted) | 27 | 7.0 |
| Product of Example 1 |  |  |
| 1) ground to meal | 54 | 5.1 |
| 2) pelleted | 69 | 5.2 |
| Product of Example 2 |  |  |
| 1) ground to meal | 64 | 4.5 |
| 2) pelleted | 73 | 4.5 |

What we claim is:

1. A method of manufacturing a feed stuff suitable for ruminants comprising forming a liquid mixture, containing one part by weight of urea, 0.2 to 1.5 parts by weight of acetic acid, 3 to 0.25 parts by weight of molasses and water in an effective amount up to 50 percent by weight of the total liquid mixture, and intimately mixing said liquid mixture with a finely divided or ground starchy material in such proportions that the liquid mixture will amount to 15–30 percent by weight of the total mix.

2. A method according to claim 1, wherein the mix is rolled and tableted or pelleted under pressure.

3. A method according to claim 1 wherein the liquid mixture contains one part by weight of urea, about one part by weight of acetic acid of a concentration of approximately 80% and about one part by weight of molasses.

4. A feedstuff suitable for ruminants comprising a liquid mixture, containing one part by weight of urea, 0.2 to 1.5 parts by weight of acetic acid, 3 to 0.25 parts by weight of molasses and water in an effective amount up to 50 percent by weight of the total liquid mixture, in admixture with a finely divided or ground starchy material in such proportions that the liquid mixture will amount to 15–30 percent by weight of the total mix.

5. The feedstuff of claim 4, which is in a rolled form.

6. The feedstuff of claim 4, which is in a tableted form.

7. The feedstuff of claim 4, which is in a pelleted form.

8. The feedstuff of claim 4, wherein the liquid mixture contains one part by weight of urea, about one part by weight of acetic acid of a concentration of approximately 80 percent and about one part by weight of molasses.

* * * * *